(12) United States Patent
Baidya et al.

(10) Patent No.: US 11,805,140 B2
(45) Date of Patent: Oct. 31, 2023

(54) SYSTEMS AND METHODS FOR UTILIZING A MACHINE LEARNING MODEL TO DETECT ANOMALIES AND SECURITY ATTACKS IN SOFTWARE-DEFINED NETWORKING

(71) Applicant: Verizon Patent and Licensing Inc., Basking Ridge, NJ (US)

(72) Inventors: Sonali Sen Baidya, Allen, TX (US); Abhishek Baidya, Allen, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 326 days.

(21) Appl. No.: 17/208,540

(22) Filed: Mar. 22, 2021

(65) Prior Publication Data
US 2022/0303290 A1  Sep. 22, 2022

(51) Int. Cl.
| | | |
|---|---|---|
| *H04L 9/40* | (2022.01) | |
| *G06N 20/00* | (2019.01) | |
| *H04L 67/1097* | (2022.01) | |
| *G06F 40/205* | (2020.01) | |

(52) U.S. Cl.
CPC ......... *H04L 63/1425* (2013.01); *G06N 20/00* (2019.01); *H04L 63/1441* (2013.01); *H04L 67/1097* (2013.01); *G06F 40/205* (2020.01)

(58) Field of Classification Search
CPC .............. H04L 63/1425; H04L 63/1441; H04L 67/1097; H04L 41/145; H04L 41/40; G06N 20/00; G06N 5/01; G06F 40/205; G06F 40/20; Y02D 30/00
See application file for complete search history.

(56) References Cited

U.S. PATENT DOCUMENTS

| | | | |
|---|---|---|---|
| 10,972,508 B1* | 4/2021 | Dods | H04L 63/1433 |
| 2019/0108338 A1* | 4/2019 | Saxe | G06N 20/00 |
| 2019/0205771 A1* | 7/2019 | Lin | G06F 40/30 |
| 2019/0253442 A1* | 8/2019 | Brabec | G06N 20/00 |
| 2019/0303726 A1* | 10/2019 | Côté | G06N 20/20 |
| 2019/0392064 A1* | 12/2019 | Swope | G06F 16/2365 |
| 2020/0021490 A1* | 1/2020 | Schrimpsher | H04L 41/0853 |

OTHER PUBLICATIONS

Ali et al., "A Machine Learning Framework for Prevention of Software-Defined Networking controller from DDOS Attacks and dimensionality reduction of big data", Oct. 2020, International Conference on Information and Communication Technology Convergence, pp. 515-519 (Year: 2020).*

Hajizadeh et al., "Probability Analysis of Successful Cyber Attacks in SDN-based Networks", Nov. 2018, IEEE Conference on Network Function Virtualization and Software Defined Networks, pp. 1-6 (Year: 2018).*

* cited by examiner

*Primary Examiner* — Kenneth W Chang

(57) ABSTRACT

A device may receive training data simulating different types of software-defined network (SDN) attacks or anomalies and may train a machine learning model with the training data to generate a trained machine learning model. The device may receive SDN data from multiple SDN controllers and multiple SDN devices of an SDN network and may perform natural language processing on the SDN data to clean the SDN data and generate clean SDN data. The device may process the clean SDN data, with the trained machine learning model, to identify an attack on the SDN network or one or more anomalies in the SDN data and may perform one or more actions based on the attack on the SDN network or the one or more anomalies in the SDN data.

20 Claims, 10 Drawing Sheets

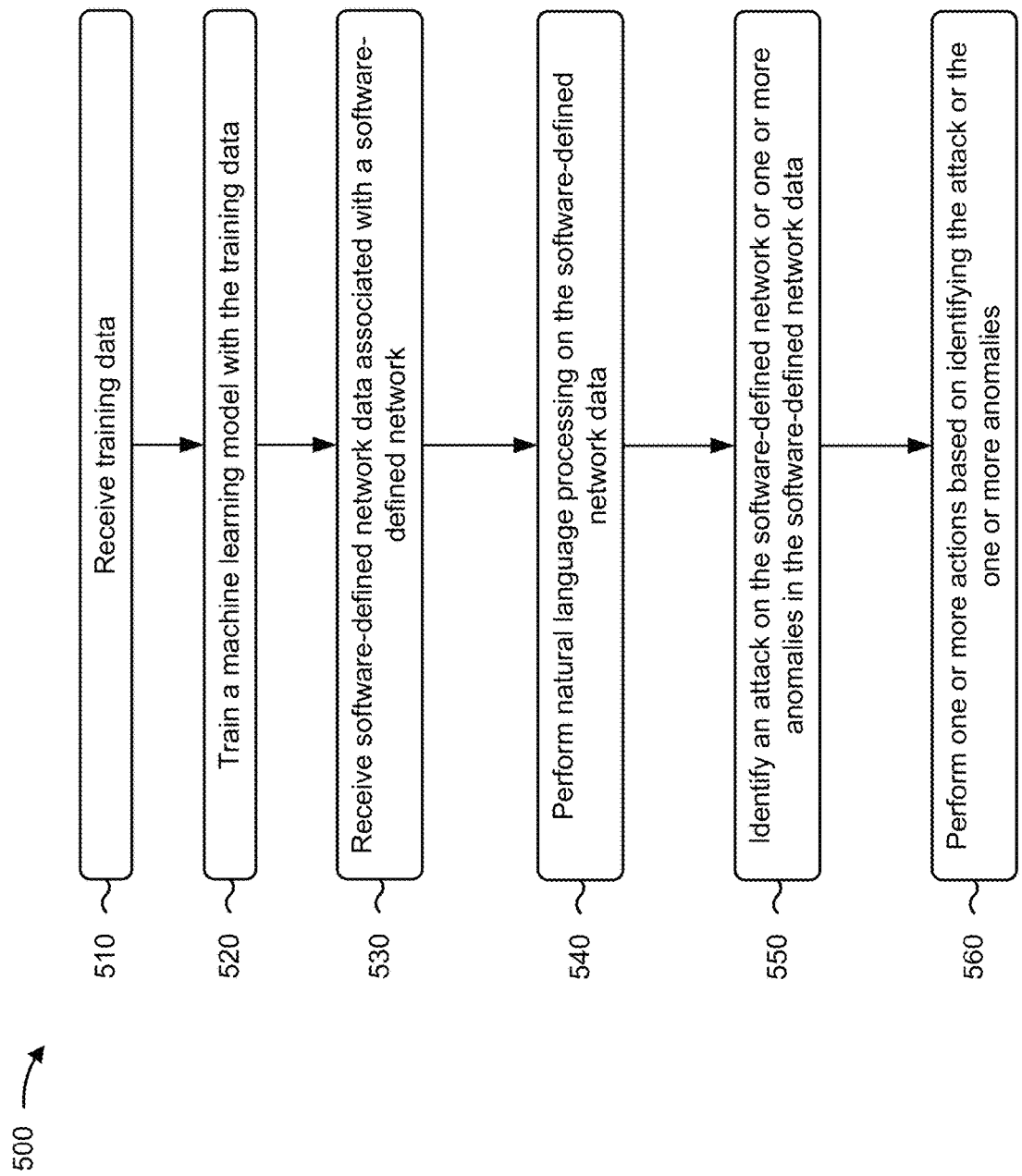

SYSTEMS AND METHODS FOR UTILIZING A MACHINE LEARNING MODEL TO DETECT ANOMALIES AND SECURITY ATTACKS IN SOFTWARE-DEFINED NETWORKING

BACKGROUND

Software-defined networking (SDN) can be adapted for use within a network to provide flexible and agile network development.

BRIEF DESCRIPTION OF THE DRAWINGS

FIG. 5 is a flowchart of an example process relating to utilizing a machine learning model to detect anomalies and security attacks in SDN networks.

DETAILED DESCRIPTION OF PREFERRED EMBODIMENTS

Figure 1A:
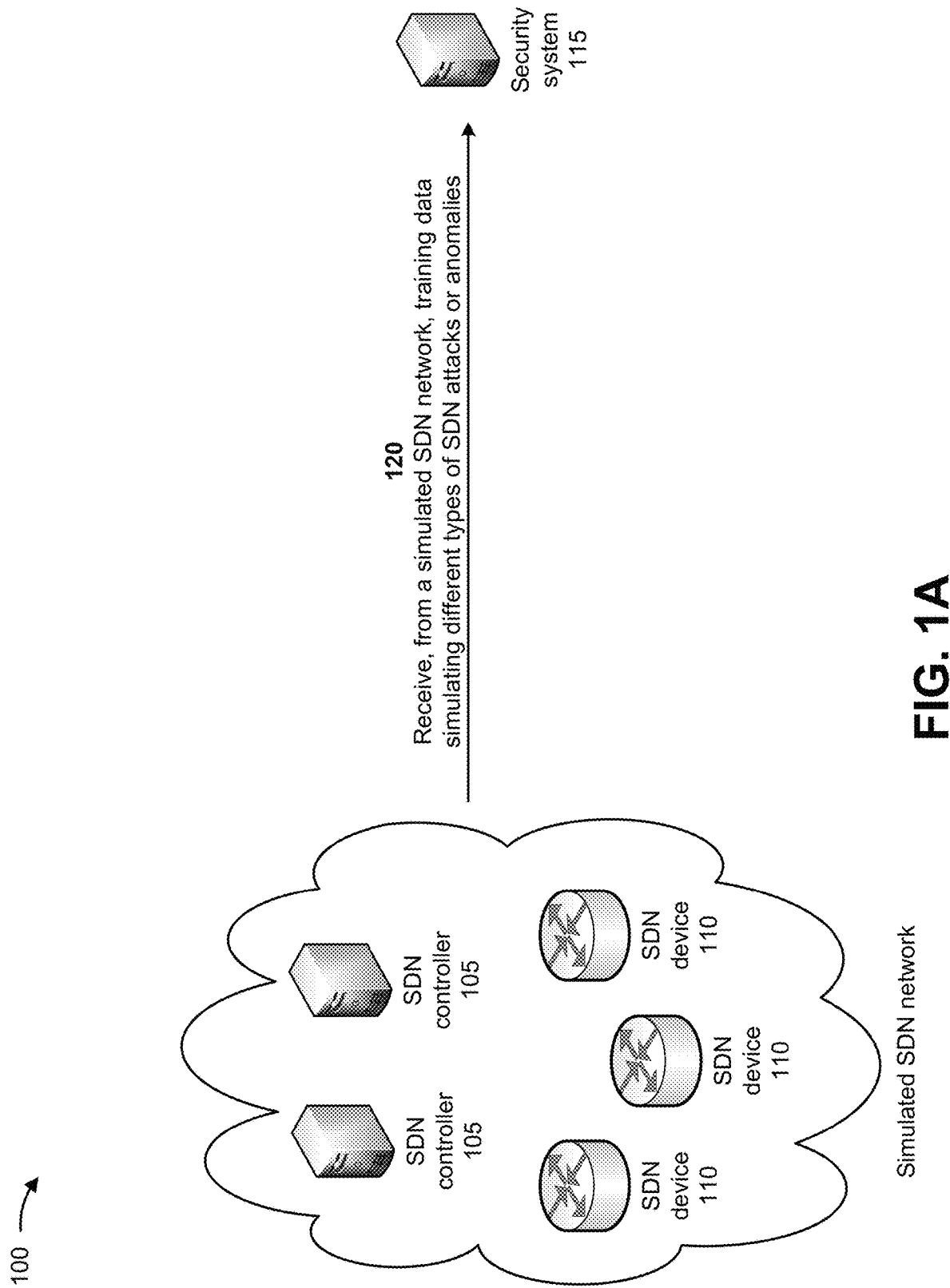
FIGS. 1A-1F are diagrams of an example associated with utilizing a machine learning model to detect anomalies and security attacks in software-defined networking (SDN) networks.

The following detailed description of example implementations refers to the accompanying drawings. The same reference numbers in different drawings may identify the same or similar elements.

A software-defined networking (SDN) network may enable effective network transformation and business growth. The SDN network may centralize network intelligence by disassociating the forwarding process of network packets (data plane) from the routing process (control plane) thereby increasing the flexibility of the SDN network relative to a static network architecture utilizing decentralized network intelligence. The SDN network may provide benefits associated with network programmability, customizability, development flexibility, lower processing expenses, improved network productivity, better network management, and/or the like. Despite many benefits that an SDN network offers, the SDN network may be subject to malicious attacks. SDN attacks may include a link discovery attack, a flow rule attack, a host location attack, and/or the like, which may lead to many other SDN network threats and attacks. Many of these attacks are easy to launch using a spoofing mechanism and are difficult to trace back to identify attackers. Some attacks may even lead to a denial of service (DoS) attack that may cause loss of services. To defend against these attacks, current techniques either rely on relatively complex data validation or use thresholds that can be subjective and are unhelpful in detecting more than one type of attack at a time.

Some implementations described herein provide a security system that utilizes a machine learning model to detect anomalies and security attacks in an SDN network. For example, the security system may receive training data simulating different types of SDN attacks or anomalies and may train a machine learning model with the training data to generate a trained machine learning model. The security system may receive SDN data from multiple SDN controllers and multiple SDN devices of an SDN network and may perform natural language processing on the SDN data to clean the SDN data and generate clean SDN data. The security system may process the clean SDN data, with the trained machine learning model, to identify an attack on the SDN network or one or more anomalies in the SDN data and may perform one or more actions based on the attack on the SDN network or the one or more anomalies in the SDN data.

In this way, the security system utilizes a machine learning model to detect anomalies and security attacks in SDN networks. The security system may utilize a machine learning model to predict SDN attacks even if such attacks occur at the same time. The security system may predict not only the presence of an SDN attack, but also a type associated with the SDN attack (e.g., a link discovery attack, a flow rule attack, a host location attack, and/or the like). The security system may also utilize natural language processing to clean up SDN data and to convert the SDN data into structured data that may be utilized by the machine learning model. By utilizing machine learning models to detect anomalies and security attacks in SDN networks, the security system may detect the anomalies and security attacks without relying on complex data validation or using thresholds that are subjective and unhelpful in detecting more than one type of attack at a time. In this way, the security system conserves computing resources, networking resources, and/or the like associated with utilizing complex data validation techniques, utilizing multiple systems to detect multiple attacks occurring at the same time, and/or the like.

FIGS. 1A-1F are diagrams of an example 100 associated with utilizing a machine learning model to detect anomalies and security attacks in an SDN network. As shown in FIGS. 1A-1F, example 100 includes an SDN network, SDN controllers 105, SDN devices 110, and a security system 115. Further details of the SDN network, the SDN controllers 105, the SDN devices 110, and the security system 115 are provided below.

As shown in FIG. 1A, and by reference number 120, the security system 115 receives, from a simulated SDN network, training data simulating different types of SDN attacks and/or anomalies. The simulated SDN network may include one or more host devices (e.g., one or more physical devices) on which components of the simulated SDN network (e.g., simulated SDN controllers 105 and/or simulated SDN devices 110) are implemented. The simulated SDN network may be configured to simulate the transmission of data packets via an SDN network during different types of SDN attacks and/or during a time period in which an SDN attack is not occurring.

The training data may include data associated with transmitting data packets during an SDN attack and/or during a time period in which an SDN attack is not occurring. For example, the training data may include data associated with an SDN device 110 receiving a data packet (e.g., a sender identifier identifying a device from which the data packet was received, information identifying a port of a device via which the data packet was transmitted, and/or the like), log data associated with logs maintained by the SDN controllers 105 during an SDN attack, log data associated with logs maintained by the SDN controllers 105 during a time period in which an SDN attack is not occurring, data plane data associated with data plane activities occurring in the SDN network during an SDN attack, data plane data associated with data plane activities occurring in the SDN network during a time period in which an SDN attack is not occurring, and/or the like.

As an example, the training data may include information associated with transmitting a data packet between a source SDN device 110 and a destination SDN device 110 through the SDN network via a path of one or more SDN devices 110. For each SDN device 110 included in the path (e.g., the source SDN device 110, the destination SDN device 110, an intermediary SDN device 110 adjacent to the source SDN device 110 and the destination SDN device 110), the training data may include information associated with the node receiving and/or transmitting the data packet. For example, the training data may include data associated with the intermediary SDN device 110 receiving the data packet from the source SDN device 110. The data associated with the intermediary SDN device 110 receiving the data packet from the source SDN device 110 may include information identifying an identifier associated with the intermediary SDN device 110, an address associated with the intermediary SDN device 110, a port at which the data packet was received, an address associated with an SDN controller 105 associated with the intermediary SDN device 110, and/or a port of the SDN controller 105 through which the intermediary SDN device 110 communicates with the SDN controller 105. Alternatively, and/or additionally, the data associated with the intermediary SDN device 110 receiving the data packet from the source SDN device 110 may include an amount of bandwidth utilized between the intermediary SDN device 110 and an adjacent SDN device 110 (e.g., the source SDN device 110 and/or the destination SDN device 110), a quantity of data packets received by the intermediary SDN device 110 via all incoming links, a quantity of data packets transmitted by the intermediary SDN device 110 via all outgoing links, a total quantity of bytes transmitted and/or received by the intermediary SDN device 110, a total quantity of data packets received by the SDN controller 105, a total quantity of data packets transmitted by the SDN controller 105, a total quantity of bytes transmitted and/or received by the SDN controller 105, a status of the SDN network (e.g., no attack, a first type of attack, a second type of attack, and/or the like) at a time the data packet was received by the intermediary SDN device 110, and/or the like.

In some implementations, the training data includes data simulating a flow rule attack, a link discovery attack, and/or a host location hijacking attack. The flow rule attack may include an attack that causes content of a flow rule, stored in a flow table associated with an SDN device 110 in a data plane of the SDN network, to be modified. For example, an attacker may attempt to manipulate the propagation of flow modification messages used to populate flow rules in a flow table of an SDN device 110. The attacker may generate fake flow modification messages and may send them to the SDN devices 110 and/or may utilize a malicious SDN device 110 to intercept a flow modification message transmitted from the SDN controller 105, modify the flow modification message to include a fake or modified flow rule, and forward the modified flow modification message to the SDN device 110 to cause the SDN device 110 to store the fake or modified flow rule in a flow table of the SDN device 110. The flow rule may define an action for each data packet related to a specific flow. For example, the flow rule may indicate that the SDN device 110 is to forward a data packet received from a first SDN device 110 to a second SDN device 110. The fake or modified flow rule may cause the flow rule to be changed to indicate that a data packet received from the first SDN device 110 is to be dropped. The training data may simulate the flow rule attack by including data indicating that data packets received by the SDN device 110 from the first SDN device 110 are dropped rather than forwarded to the second SDN device 110.

A link discovery attack may cause an SDN controller 105 to incorrectly determine that a link exists in the SDN network (e.g., a false link). A control plane of the SDN network may provide a network topology service to manage and/or update topological information associated with the SDN network and to provide the topological information to application level services (e.g., routing, network management, policy implementation, security services, and/or the like) of the SDN network. An SDN controller 105 may use a link discovery process to dynamically detect direct links between adjacent SDN devices 110. For example, the SDN controller 105 may utilize a link layer discovery protocol (LLDP) packet to dynamically detect the direct links. To implement a link discovery attack, an attacker may attempt to create a fake link in the SDN network during the link discovery process.

For example, an attacker may attempt to manipulate the propagation of LLDP packets during the link discovery process. The attacker may generate fake LLDP packets and may send them to the SDN devices 110 and/or may utilize a malicious SDN device 110 to intercept an LLDP packet transmitted from one SDN device 110 and relay the LLDP packet to another SDN device 110 to cause the SDN controller 105 to determine that a false link exists between the two SDN devices 110. As a result, if traffic is routed through the false link, the traffic will be dropped (e.g., when the attacker generates and sends the fake LLDP packets) or will be routed through a malicious SDN device 110 associated with the attacker (e.g., when the attacker utilizes the malicious SDN device 110 to intercept the LLDP packet), thereby letting the attacker eavesdrop on the traffic.

The training data may enable a link discovery attack to be simulated by including data indicating an LLDP packet transmitted via a false link. For example, the training data may include data indicating that an SDN device 110 received an LLDP packet from a device associated with a false sender identifier or network address, a device associated with a legitimate sender identifier or network address but via a non-existent or an unused port, and/or the like.

In the SDN network, an SDN controller 105 may maintain location information identifying network locations of host devices. A host location hijacking attack may include an attacker hijacking and modifying location information associated with a host device and providing the modified location information to the SDN controller 105. By causing the SDN controller 105 to maintain the modified location information for the host device, an attacker can use a malicious SDN device 110 to impersonate the host device in the SDN network. The training data may enable the host location hijacking attack to be simulated by including data that causes an SDN controller 105 to modify the location information for a host device to indicate incorrect location information (e.g., location information not associated with a host device, location information associated with a host device associated with the attacker, and/or the like).

Figure 1B:
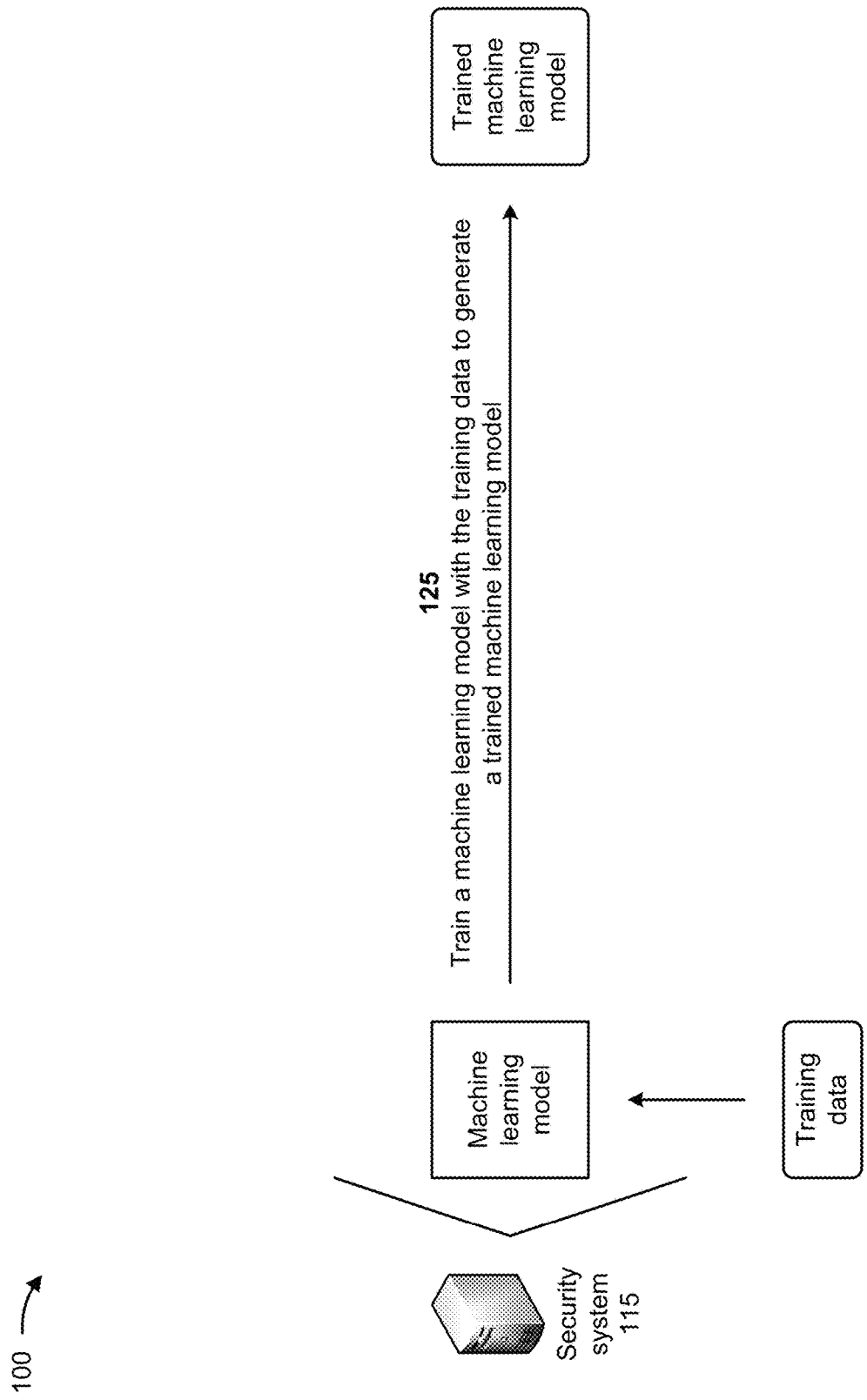

As shown in FIG. 1B, and by reference number 125, the security system 115 trains a machine learning model with the training data to generate a trained machine learning model. The machine learning model may utilize one or more machine learning algorithms to generate a predictive model for predicting an attack on the SDN network and/or an anomaly in SDN data associated with the SDN network. In some implementations, the machine learning model may include a regression machine learning model, a BayesNet machine learning model, a decision tree machine learning model, and/or a decision table machine learning model.

The security system 115 may train the machine learning model with training data associated with transmitting a data packet between a source SDN device 110 and a destination SDN device 110, via the SDN network, during a time period in which no attack is occurring, during a link discovery attack, a flow rule attack, a host location attack, and/or the like. The security system 115 may train the machine learning model to determine whether an attack is occurring and, if so, a type of the attack.

In some implementations, the security system 115 may train the machine learning model in a manner similar to that described below with respect to FIG. 2. Alternatively, and/or additionally, the security system 115 may obtain the trained machine learning model from another device.

Figure 1C:
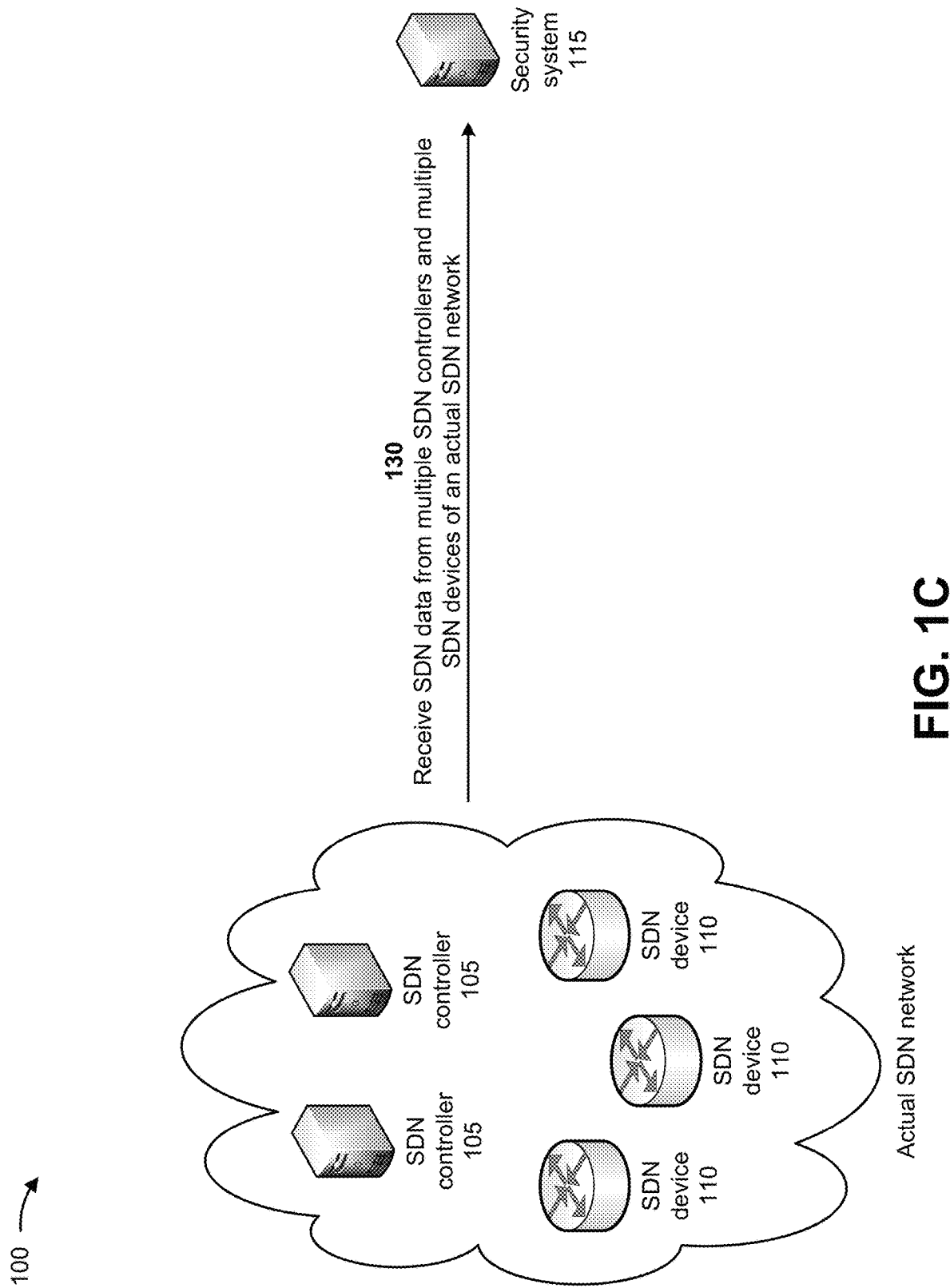

As shown in FIG. 1C, and by reference number 130, the security system 115 receives SDN data from multiple SDN controllers 105 and multiple SDN devices 110 of an actual SDN network. The security system 115 may periodically request and/or receive the SDN data from the multiple SDN controllers 105 and may store the received SDN data in a data structure (e.g., a database, a table, a list, and/or the like). The SDN data received from an SDN controller 105 may include data associated with events and logs associated with the SDN controller 105. For example, the SDN data may include information associated with each SDN device 110 receiving and/or transmitting a data packet as the data packet is transmitted from a source SDN device 110 to a destination SDN device 110 via one or more SDN devices 110 of the SDN network. In some implementations, the information associated with each node may be similar to the information included in the training data and associated with transmitting a data packet along a path through the simulated SDN network.

Figure 1D:
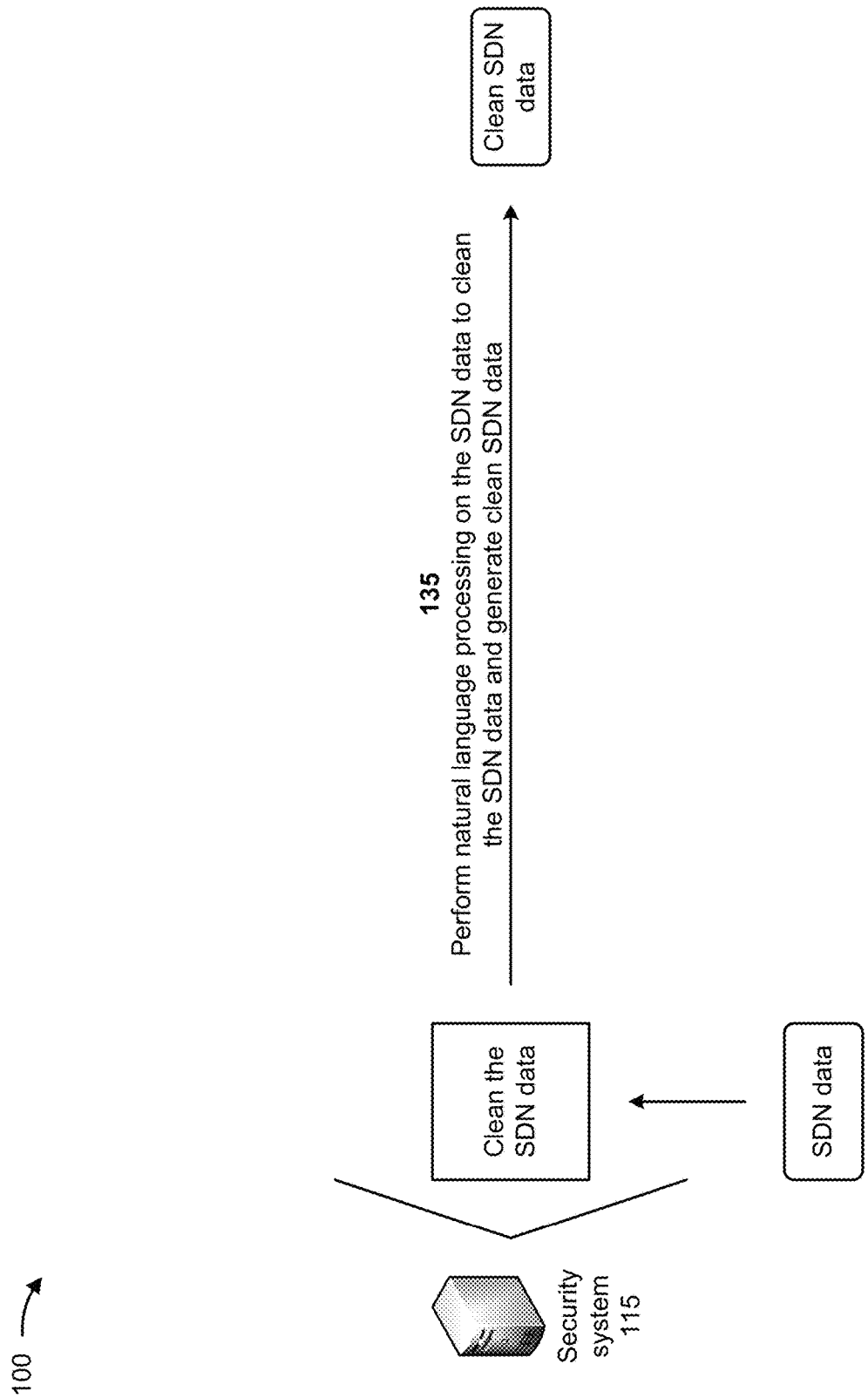

As shown in FIG. 1D, and by reference number 135, the security system 115 performs natural language processing (NLP) on the SDN data to clean the SDN data and generate clean SDN data. A format of the clean SDN data may be processable by the machine learning model. For example, the SDN data may include unstructured data. The security system 115 may perform NLP on the unstructured data to generate structured data corresponding to the clean SDN data. In some implementations, the security system 115 performs NLP on the unstructured data to generate a table storing parameters and corresponding values of the parameters associated with an SDN controller 105 and/or an SDN device 110. The security system 115 may generate a respective table for each SDN controller 105 and/or SDN device 110 included in the SDN network.

In some implementations, the security system 115 cleans the SDN data based on domain knowledge to generate pre-cleaned SDN data. For example, the security system 115 may identify incorrect, incomplete, inaccurate, irrelevant, and/or missing portions of the SDN data based on other portions of the SDN data, a topography of the SDN network, historical SDN data, and/or the like. The security system 115 may generate the pre-cleaned SDN data by modifying, replacing, deleting and/or adding data to the incorrect, incomplete, inaccurate, irrelevant, and/or missing portions of the SDN data. The security system 115 may perform NLP on the pre-cleaned SDN data to format the pre-cleaned SDN data and generate the clean SDN data.

Figure 1E:
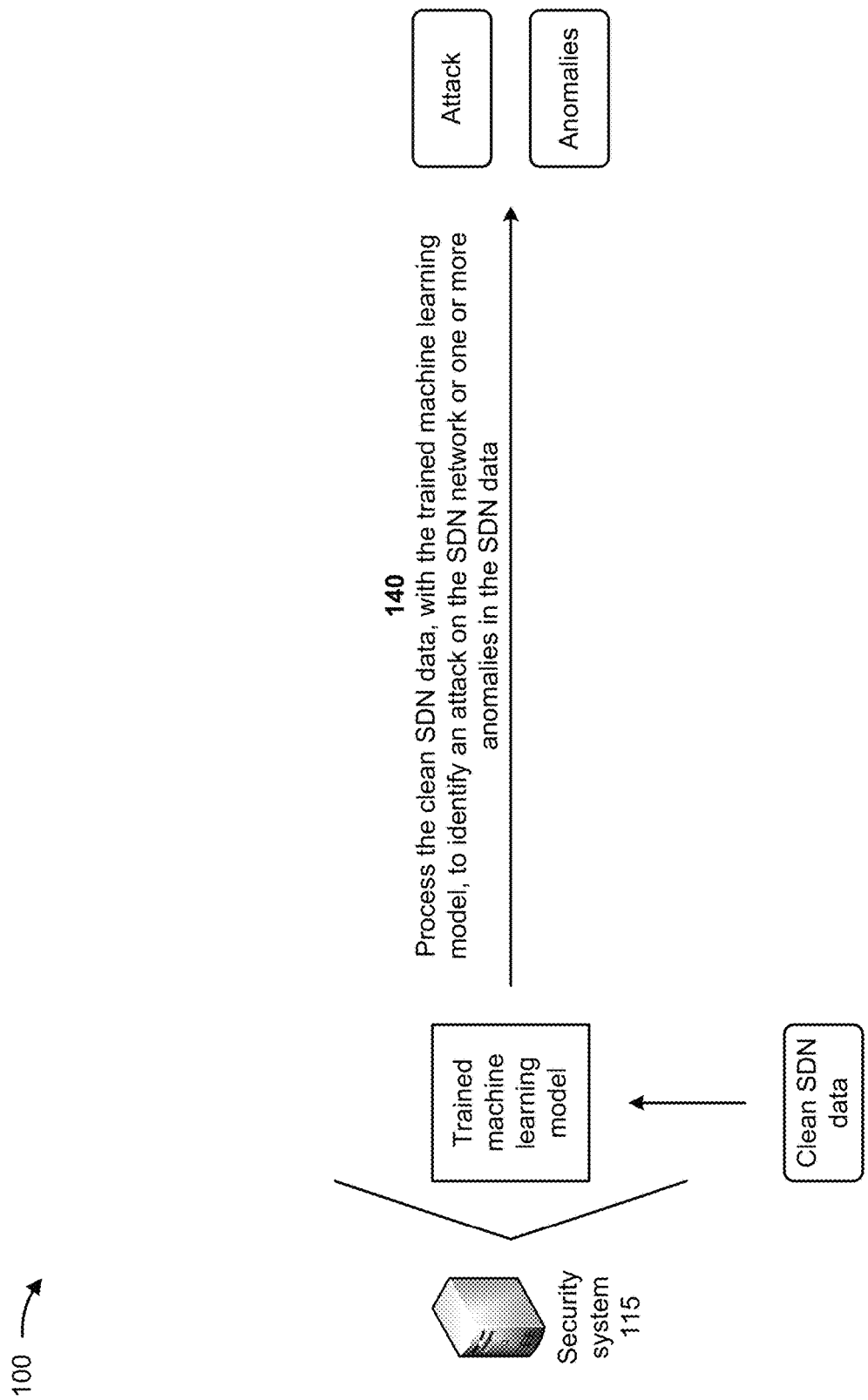

As shown in FIG. 1E, and by reference number 140, the security system 115 processes the clean SDN data with the trained machine learning model to identify an attack on the SDN network and/or one or more anomalies in the SDN data. The trained machine learning model may receive the clean SDN data as an input and may categorize the clean SDN data based on identifying patterns in the SDN data. The security system 115 may identify an attack on the SDN network and/or an anomaly in the SDN data based on a category associated with a pattern identified in the SDN data.

As an example, the trained machine learning model may identify a pattern associated with an SDN device 110 providing information indicating that the SDN device 110 received a data packet from a non-existent SDN device 110 and/or a non-existent or unused port of an SDN device 110. The trained machine learning model may categorize the pattern as a link discovery attack based on the pattern being associated with an SDN device 110 providing information indicating that the SDN device 110 received a data packet from a non-existent SDN device 110 and/or a non-existent or unused port of an SDN device 110. The security system 115 may identify a link discovery attack on the SDN network based on the pattern being categorized as a link discovery attack.

As another example, the trained machine learning model may identify a pattern associated with a large quantity of dropped data packets by an SDN device 110, a flow rule in a flow table of the SDN device 110 indicating that data packets received from a particular SDN device 110 are to be dropped, and a flow table of an SDN controller 105 indicating that the SDN device 110 is to forward data packets received from the particular SDN device 110 to another SDN device 110. The trained machine learning model may categorize the pattern as a flow rule attack based on the pattern being associated with a large quantity of dropped data packets by an SDN device 110, a flow rule in a flow table of the SDN device 110 indicating that data packets received from a particular SDN device 110 are to be dropped, and a flow table of an SDN controller 105 indicating that the SDN device 110 is to forward data packets received from the particular SDN device 110 to another SDN device 110. The security system 115 may identify a flow rule attack on the SDN network based on the pattern being categorized as a flow rule attack.

As another example, the trained machine learning model may identify a pattern associated with a significant increase in network traffic and a continuous transmission of probing address resolution protocol (ARP) packets. The trained machine learning model may categorize the pattern as a host location attack based on the pattern being associated with a significant increase in network traffic and a continuous transmission of probing ARP packets. The security system 115 may identify a host location attack based on the pattern being categorized as a host location attack.

In some implementations, the security system 115 processes the clean SDN data with the trained machine learning model to identify an existence of the attack and/or a type associated with the attack and a confidence score indicating a degree of reliability that the existence of the attack and/or the type associated with the attack is accurately identified based on the clean SDN data. For example, the security system 115 may process the clean SDN data with the trained machine learning model to identify a link discovery attack, a flow rule attack, a host location attack, and/or the like and a confidence score indicating a degree of reliability that the link discovery attack, the flow rule attack, the host location attack, and/or the like is accurately identified based on the clean SDN data.

Figure 1F:
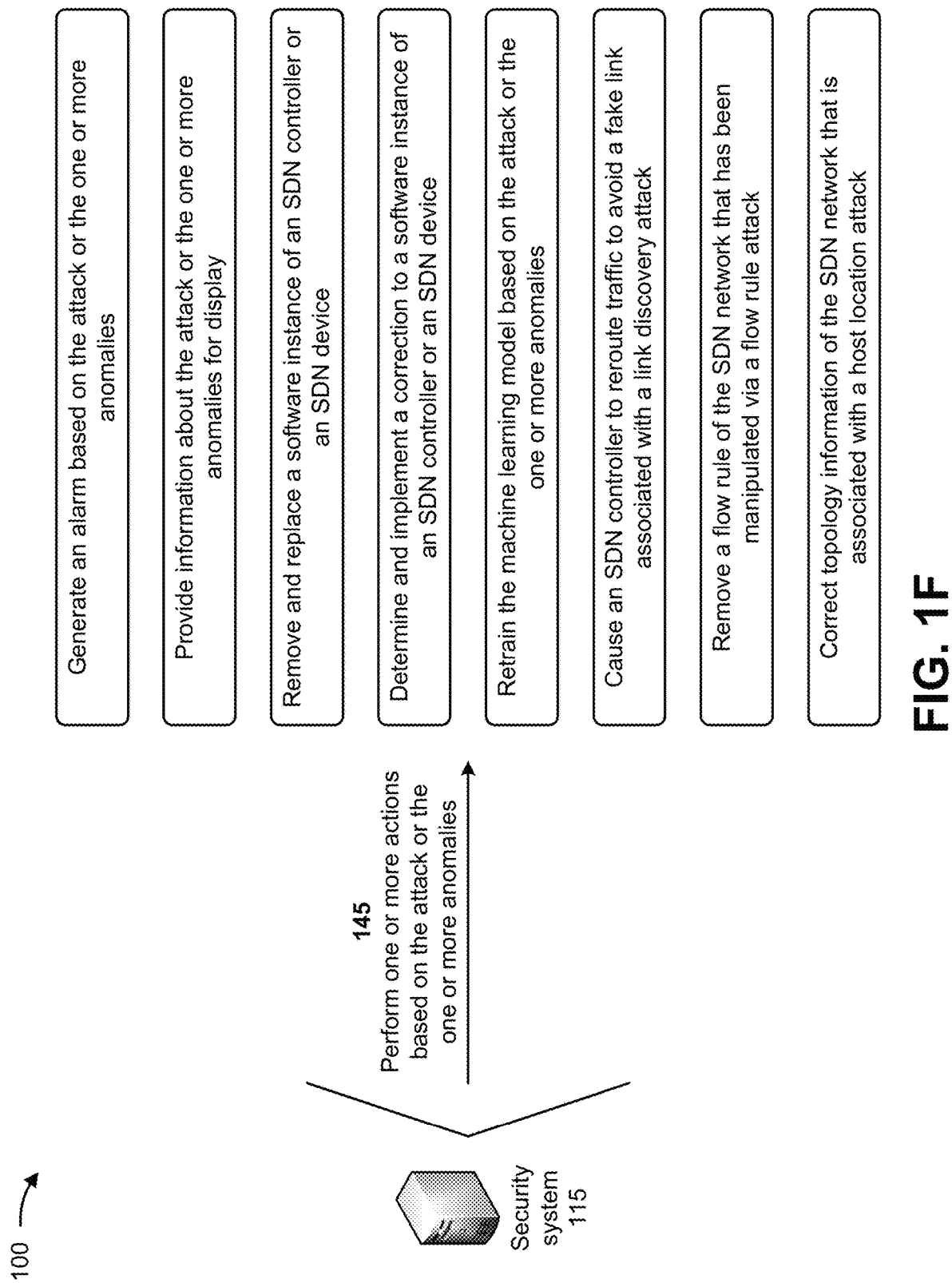

As shown in FIG. 1F, and by reference number 145, the security system 115 performs one or more actions based on the attack and/or the one or more anomalies. In some implementations, the one or more actions include the security system 115 generating an alarm based on the attack and/or the one or more anomalies and/or providing information about the attack and/or the one or more anomalies for display. The security system 115 may generate the alarm and/or may provide information about the attack and/or the one or more anomalies for display to notify a user (e.g., a network administrator) of the attack and/or the one or more anomalies. Alternatively, and/or additionally, the one or more actions may include the security system 115 removing a software instance of an SDN controller 105 and/or an SDN device 110, replacing a software instance of an SDN controller 105 and/or an SDN device 110, determining a correction to a software instance of an SDN controller 105 and/or an SDN device 110, and/or implementing a correction to a software instance of an SDN controller 105 and/or an SDN device 110.

In some implementations, the one or more actions include the security system 115 causing an SDN controller 105 to perform an action to mitigate an effect of an attack on the SDN network. For example, the security system 115 may cause an SDN controller 105 to reroute traffic to avoid a fake link associated with a link discover attack, to remove a flow rule of the SDN network that has been manipulated via a flow rule attack, to correct topology information of the SDN network that is associated with a host location attack, and/or the like.

In some implementations, the one or more actions include retraining the machine learning model based on the attack or the one or more anomalies. The security system 115 may utilize the attack or the one or more anomalies as additional training data for retraining the machine learning model, thereby increasing the quantity of training data available for training the machine learning model. Accordingly, the security system 115 may conserve computing resources associated with identifying, obtaining, and/or generating historical data for training the machine learning model relative to other systems for identifying, obtaining, and/or generating historical data for training machine learning models.

In this way, the security system 115 utilizes a machine learning model to detect anomalies and security attacks in SDN networks. The security system 115 may utilize a machine learning model to predict multiple SDN attacks even if such attacks occur at the same time. The security system 115 may predict not only the presence of an SDN attack, but also a type associated with the SDN attack. Further, the security system 115 may predict the SDN attacks without using complex data validation techniques. Thus, the security system 115 conserves computing resources, networking resources, and/or the like associated with utilizing complex data validation techniques, utilizing multiple systems to detect multiple SDN attacks occurring at the same time, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
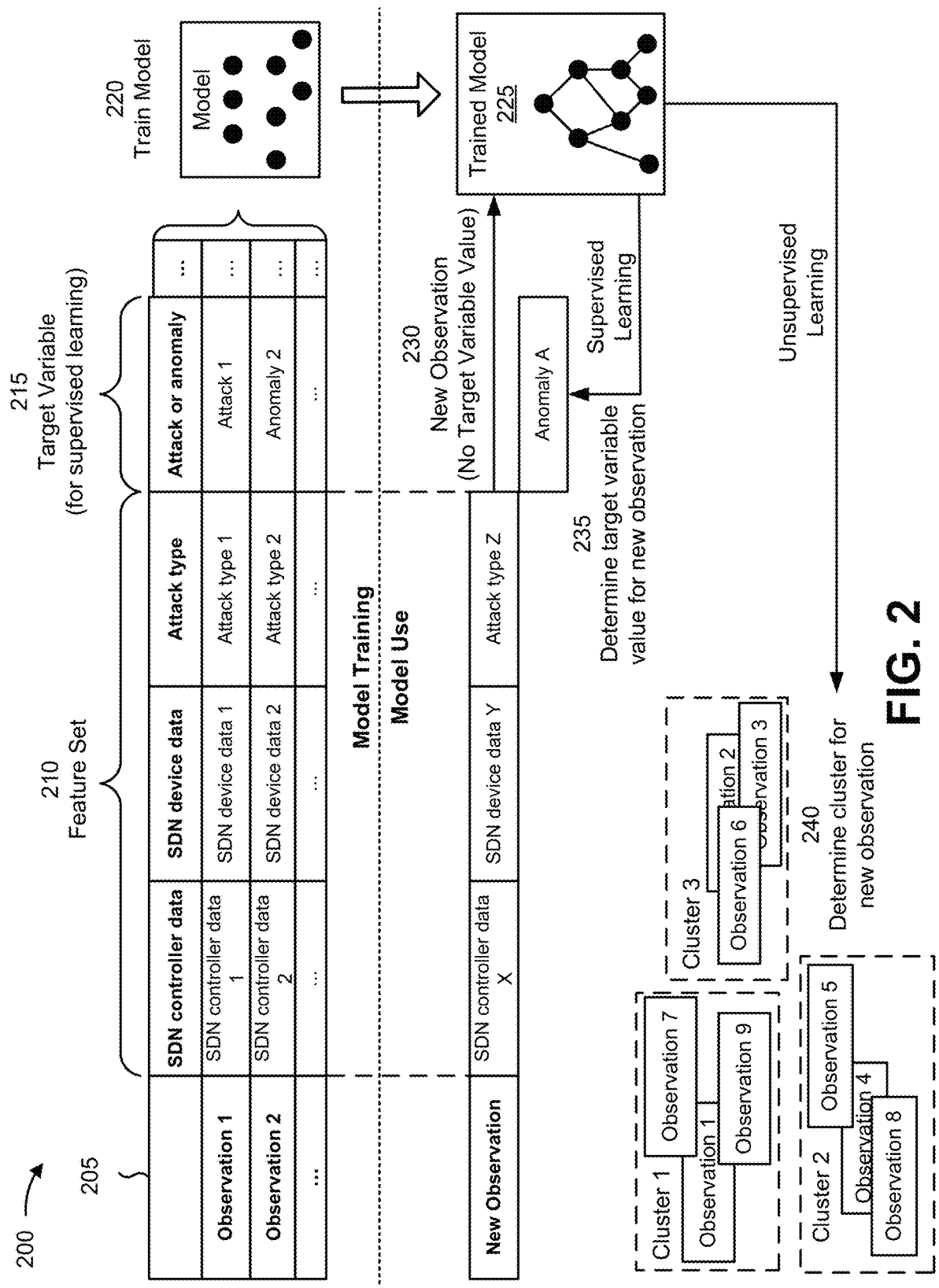
FIG. 2 is a diagram illustrating an example of training and using a machine learning model in connection with detecting anomalies and security attacks in SDN networks.

FIG. 2 is a diagram illustrating an example 200 of training and using a machine learning model in connection with detecting anomalies and security attacks in SDN networks. The machine learning model training and usage described herein may be performed using a machine learning system. The machine learning system may include or may be included in a computing device, a server, a cloud computing environment, or the like, such as the security system 115 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the SDN network, the SDN controllers 105, the SDN devices 110, and/or the security system 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the SDN controllers 105, the SDN devices 110, and/or the security system 115. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of SDN controller data, a second feature of SDN device data, a third feature of attack types, and so on. As shown, for a first observation, the first feature may have a value of SDN controller data 1, the second feature may have a value of SDN device data 1, the third feature may have a value of attack type 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is an attack or an anomaly, which has a value of attack 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of SDN controller data X, a second feature of SDN device data Y, a third feature of attack type Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of anomaly A for the target variable of attack or anomaly for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, address anomaly A to remove it from the SDN network. The first automated action may include, for example, removing anomaly A from the SDN network.

As another example, if the machine learning system were to predict a value of attack B for the target variable of attack or anomaly, then the machine learning system may provide a second (e.g., different) recommendation (e.g., address attack B to eliminate it from the SDN network) and/or may perform or cause performance of a second (e.g., different) automated action (e.g., eliminating attack B from the SDN network).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an SDN controller data cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., an SDN device data cluster), then the machine learning system may provide a second (e.g., different) recommendation, such as the second recommendation described above and/or may perform or cause performance of a second automated action, such as the second automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detect anomalies and security attacks in SDN networks. The machine learning system enables recognition and/or identification of tens, hundreds, thousands, or millions of features and/or feature values for tens, hundreds, thousands, or millions of observations, thereby increasing accuracy and consistency and reducing delay associated with detecting anomalies and security attacks in SDN networks relative to requiring computing resources to be allocated for tens, hundreds, or thousands of operators to manually detect anomalies and security attacks in SDN networks.

As indicated above, FIG. 2 is provided as an example. Other examples may differ from what is described in connection with FIG. 2.

Figure 3:
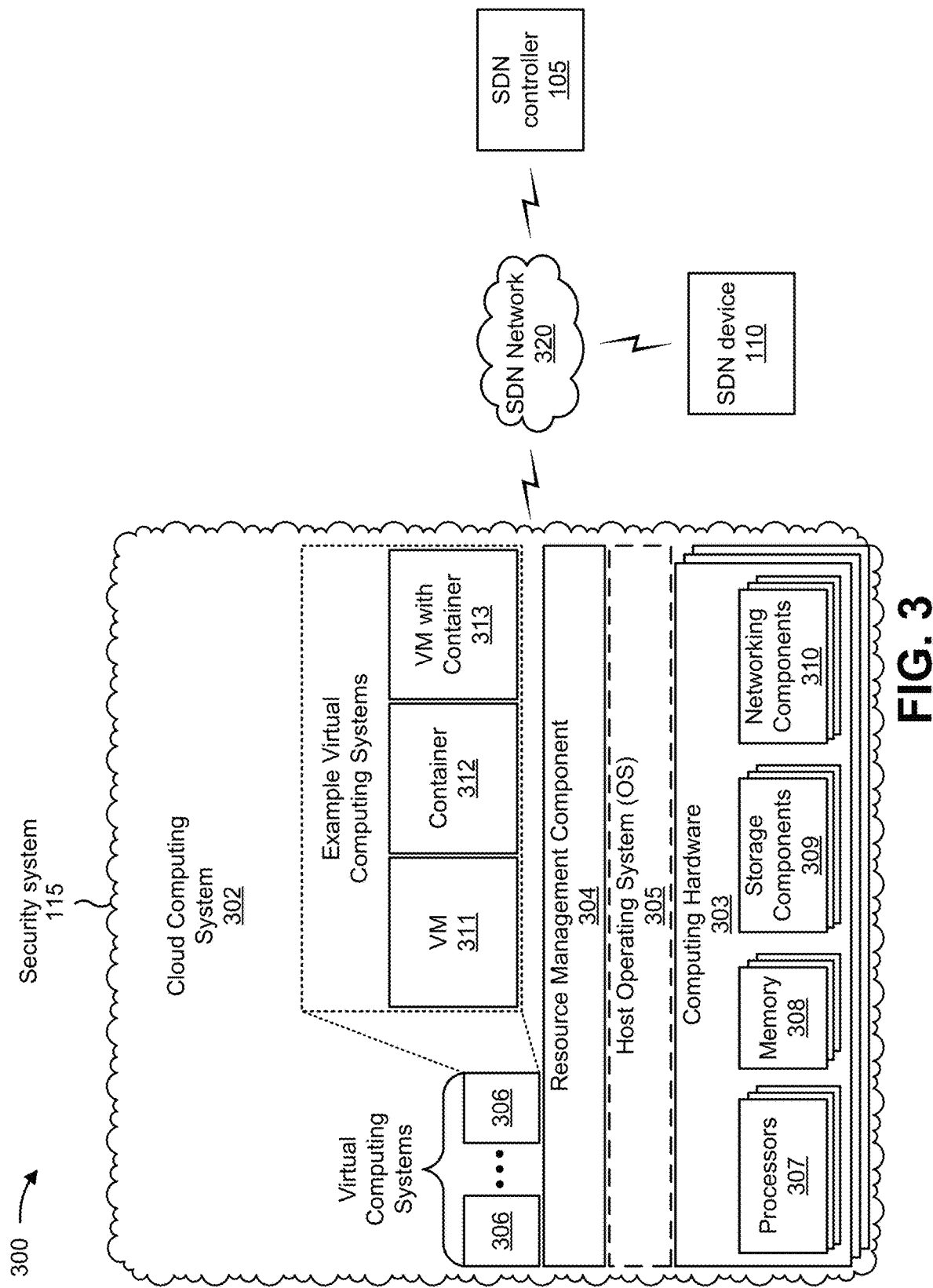
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a security system 115, which may include one or more elements of and/or may execute within a cloud computing system 302. The cloud computing system 302 may include one or more elements 303-313, as described in more detail below. As further shown in FIG. 3, environment 300 may include an SDN network 320, an SDN controller 105, and/or an SDN device 110. Devices and/or elements of environment 300 may interconnect via wired connections and/or wireless connections.

The SDN controller 105 includes one or more devices capable of receiving, generating, storing, processing, providing, and/or routing information, as described elsewhere herein. The SDN controller 105 may include a communication device and/or a computing device. For example, the SDN controller 105 may include a server, such as an application server, a client server, a web server, a database server, a host server, a proxy server, a virtual server (e.g., executing on computing hardware), or a server in a cloud computing system. In some implementations, the SDN controller 105 includes computing hardware used in a cloud computing environment.

The SDN device 110 includes one or more devices capable of receiving, processing, storing, routing, and/or providing traffic (e.g., a packet and/or other information or metadata) in a manner described herein. For example, the SDN device 110 may include a router, such as a label switching router (LSR), a label edge router (LER), an ingress router, an egress router, a provider router (e.g., a provider edge router or a provider core router), a virtual router, or another type of router. Additionally, or alternatively, the SDN device 110 may include a gateway, a switch, a firewall, a hub, a bridge, a reverse proxy, a server (e.g., a proxy server, a cloud server, or a data center server), a load balancer, and/or a similar device. In some implementations, the SDN device 110 may be a physical device implemented within a housing, such as a chassis. In some implementations, the SDN device 110 may be a virtual device implemented by one or more computing devices of a cloud computing environment or a data center. In some implementations, a group of SDN devices 110 may be a group of data center nodes that are used to route traffic flow through an SDN network.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the security system 115 may include one or more elements 303-313 of the cloud computing system 302, may execute within the cloud computing system 302, and/or may be hosted within the cloud computing system 302, in some implementations, the security system 115 may not be cloud-based (e.g., may be implemented outside of a cloud computing system) or may be partially cloud-based. For example, the security system 115 may include one or more devices that are not part of the cloud computing system 302, such as device 400 of FIG. 4, which may include a stand-alone server or another type of computing device. The security system 115 may perform one or more operations and/or processes described in more detail elsewhere herein.

The SDN network 320 includes one or more wired and/or wireless networks that utilize SDN technology. For example, the SDN network 320 may include a cellular network, a public land mobile network (PLMN), a local area network (LAN), a wide area network (WAN), a private network, the Internet, and/or a combination of these or other types of networks utilizing SDN technology. The SDN network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
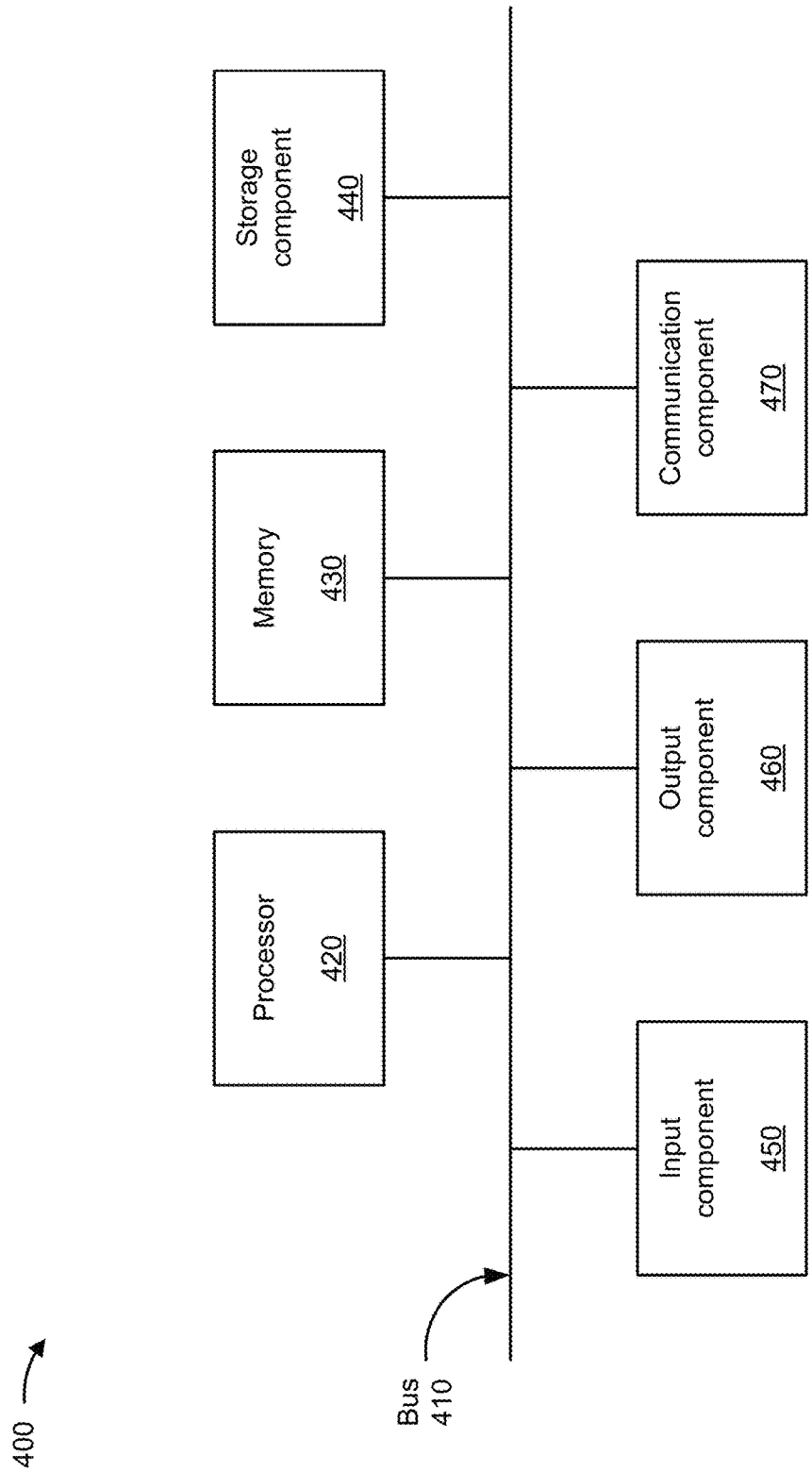
FIG. 4 is a diagram of example components of one or more devices of FIG. 3.

FIG. 4 is a diagram of example components of a device 400, which may correspond to an SDN controller 105, an SDN device 110, and/or a security system 115. In some implementations, the SDN controller 105, the SDN device 110, and/or the security system 115 may include one or more devices 400 and/or one or more components of device 400. As shown in FIG. 4, device 400 may include a bus 410, a processor 420, a memory 430, a storage component 440, an input component 450, an output component 460, and a communication component 470.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The storage component 440 stores information and/or software related to the operation of device 400. For example, the storage component 440 may include a hard disk drive, a magnetic disk drive, an optical disk drive, a solid-state disk drive, a compact disc, a digital versatile disc, and/or another type of non-transitory computer-readable medium. The input component 450 enables the device 400 to receive input, such as user input and/or sensed inputs. For example, the input component 450 may include a touch screen, a keyboard, a keypad, a mouse, a button, a microphone, a switch, a sensor, a global positioning system component, an accelerometer, a gyroscope, and/or an actuator. The output component 460 enables the device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, and/or an antenna.

The device 400 may perform one or more processes described herein. For example, a non-transitory computer-readable medium (e.g., the memory 430 and/or the storage component 440) may store a set of instructions (e.g., one or more instructions, code, software code, and/or program code) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with utilizing a machine learning model to detect anomalies and security attacks in SDNs. In some implementations, one or more process blocks of FIG. 5 may be performed by a device (e.g., the security system 115). In some implementations, one or more process blocks of FIG. 5 may be performed by another device or a group of devices separate from or including the device, such as an SDN controller (e.g., the SDN controller 105) and/or an SDN device (e.g., the SDN device 110). Additionally, or alternatively, one or more process blocks of FIG. 5 may be performed by one or more components of device 400, such as the processor 420, the memory 430, the storage component 440, the input component 450, the output component 460, and/or the communication component 470.

As shown in FIG. 5, process 500 may include receiving training data (block 510). For example, the device may receive training data simulating different types of SDN attacks or anomalies, as described above. The training data may include data that simulates a link discovery attack, data that simulates a flow rule attack, data that simulates a host location attack, data that simulates no attacks on the SDN network, data that identifies a plurality of anomalies, and/or the like.

As further shown in FIG. 5, process 500 may include training a machine learning model with the training data (block 520). For example, the device may train a machine learning model with the training data to generate a trained machine learning model, as described above. The machine learning model may include a regression model, a Bayesian classifier model, a decision tree model, and/or a decision table model.

In some implementations, the device may remove a portion of data from the training data prior to training the machine learning model. The device may test the trained machine learning model with the removed portion of the data to generate test results. The device may update the trained machine learning model based on the test results.

As further shown in FIG. 5, process 500 may include receiving SDN data associated with an SDN network (e.g., data relating to traffic transmitted through the SDN network) (block 530). For example, the device may receive SDN data from multiple SDN controllers and/or multiple SDN devices of an SDN network, as described above.

As further shown in FIG. 5, process 500 may include performing natural language processing on the SDN data (block 540). For example, the device may perform natural language processing on the SDN data to clean the SDN data and generate clean SDN data, as described above. In some implementations, the device may clean the SDN data based on domain knowledge to generate pre-cleaned SDN data. The device may perform NLP on the pre-cleaned SDN data to format the pre-cleaned SDN data and generate the clean SDN data. A format of the clean SDN data may be processable by the machine learning model.

As further shown in FIG. 5, process 500 may include identifying an attack on the SDN network or one or more anomalies in the SDN data (block 550). For example, the device may process the clean SDN data, with the trained machine learning model, to identify an attack on the SDN and/or one or more anomalies in the SDN data, as described above. In some implementations, the device may process the clean SDN data with the trained machine learning model to identify an existence of the attack and/or a type associated with the attack. The attack and/or the type of the attack may include a link discovery attack, a flow rule attack, a host location attack, and/or the like.

As further shown in FIG. 5, process 500 may include performing one or more actions based on identifying the attack or the one or more anomalies (block 560). For example, the device may perform one or more actions based on the attack on the SDN network and/or the one or more anomalies in the SDN data, as described above.

The one or more actions may include generating an alarm based on the attack on the SDN network or the one or more anomalies in the SDN data, providing information about the attack or the one or more anomalies for display, retraining the machine learning model based on the attack on the SDN network or the one or more anomalies in the SDN data, removing a software instance of one of the multiple SDN controllers, removing a software instance of one of the multiple SDN devices, replacing a software instance of one of the multiple SDN controllers with a new software instance of an SDN controller, replacing a software instance of one of the multiple SDN devices with a new software instance of an SDN device, determining a correction to a software instance of one of the multiple SDN controllers or a software instance of one of the multiple SDN devices, and/or implementing a correction to a software instance of the one of the multiple SDN controllers or a software instance of the one of the multiple SDN devices.

Alternatively, and/or additionally, the one or more actions may include causing one of the multiple SDN controllers to reroute traffic to avoid a fake link associated with a link discovery attack, removing a flow rule of the SDN network that has been manipulated via a flow rule attack, and/or correcting topology information, of the SDN network, that is associated with a host location attack.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of a list of" items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, training data simulating different types of software-defined networking (SDN) attacks or anomalies;
    removing, by the device, a portion of data from the training data;
    training, by the device, a machine learning model with the training data to generate a trained machine learning model;
    testing, by the device, the trained machine learning model with the portion of data removed from the training data to generate test results;
    updating, by the device, the trained machine learning model based on the test results;
    receiving, by the device, SDN data from multiple SDN controllers and multiple SDN devices of an SDN network;
    performing, by the device, natural language processing on the SDN data to clean the SDN data and generate clean SDN data;
    identifying, by the device, an attack on the SDN network or one or more anomalies in the SDN data based on processing the clean SDN data with the trained machine learning model; and
    performing, by the device, one or more actions based on the attack on the SDN network or the one or more anomalies in the SDN data.

2. The method of claim 1, wherein the training data includes one or more of:
    data that simulates a link discovery attack,
    data that simulates a flow rule attack,
    data that simulates a host location attack,
    data that simulates no attacks on the SDN network, or
    data that identifies a plurality of anomalies.

3. The method of claim 1, wherein the training data includes one or more of:
    data indicating a link layer discovery protocol packet transmitted via a false link;

data that causes an SDN controller to modify location information for a host device to indicate incorrect location information;
data indicating a pattern associated with an SDN device providing information indicating that the SDN device received a data packet from a non-existent SDN device; or
data indicating a quantity of packets being processed based on an incorrect flow rule.

4. The method of claim 1, wherein identifying the attack comprises:
identifying an existence of the attack and a type associated with the attack based on processing the clean SDN data with the trained machine learning model,
wherein the attack includes one or more of:
a link discovery attack,
a flow rule attack, or
a host location attack.

5. The method of claim 1, wherein the machine learning model includes one or more of:
a regression model,
a Bayesian classifier model,
a decision tree model, or
a decision table model.

6. The method of claim 1, wherein performing natural language processing on the SDN data to clean the SDN data and generate the clean SDN data comprises:
cleaning the SDN data, based on domain knowledge, to generate pre-cleaned SDN data; and
performing natural language processing on the pre-cleaned SDN data to format the pre-cleaned SDN data and generate the clean SDN data.

7. The method of claim 1, wherein performing the one or more actions comprises one or more of:
generating an alarm based on the attack on the SDN network or the one or more anomalies in the SDN data; or
providing information about the attack or the one or more anomalies for display.

8. A device, comprising:
one or more memories; and
one or more processors, coupled to the one or more memories, configured to:
receive training data simulating different types of software-defined networking (SDN) attacks or anomalies;
remove a portion of data from the training data;
train a machine learning model with the training data to generate a trained machine learning model;
test the trained machine learning model with the portion of data removed from the training data to generate test results;
update the trained machine learning model based on the test results;
receive SDN data from multiple SDN controllers and multiple SDN devices of an SDN network;
perform natural language processing on the SDN data to clean the SDN data and generate clean SDN data;
process the clean SDN data, with the trained machine learning model, to identify an attack on the SDN network or one or more anomalies in the SDN data; and
perform one or more actions based on the attack on the SDN network or the one or more anomalies in the SDN data.

9. The device of claim 8, wherein the clean SDN data comprises structured data that is processable by the machine learning model.

10. The device of claim 8, wherein the one or more processors, when performing the one or more actions, are configured to one or more of:
generate an alarm based on the attack on the SDN network or the one or more anomalies in the SDN data;
provide information about the attack or the one or more anomalies for display; or
retrain the machine learning model based on the attack on the SDN network or the one or more anomalies in the SDN data.

11. The device of claim 8, wherein the one or more processors, when performing the one or more actions, are configured to:
remove a software instance of one of the multiple SDN controllers or a software instance of one of the multiple SDN devices; and
replace the software instance with a new software instance of an SDN controller or a new software instance of an SDN device.

12. The device of claim 8, wherein the one or more processors, when performing the one or more actions, are configured to:
determine a correction to a software instance of one of the multiple SDN controllers or a software instance of one of the multiple SDN devices; and
implement the correction to the software instance of the one of the multiple SDN controllers or the software instance of the one of the multiple SDN devices.

13. The device of claim 8, wherein the one or more processors, when performing the one or more actions, are configured to one or more of:
cause one of the multiple SDN controllers to reroute traffic to avoid a fake link associated with a link discovery attack;
remove a flow rule of the SDN network that has been manipulated via a flow rule attack; or
correct topology information, of the SDN network, that is associated with a host location attack.

14. The device of claim 8, wherein the training data includes one or more of:
data indicating a link layer discovery protocol packet transmitted via a false link;
data that causes an SDN controller to modify location information for a host device to indicate incorrect location information;
data indicating a pattern associated with an SDN device providing information indicating that the SDN device received a data packet from a non-existent SDN device; or
data indicating a quantity of packets being processed based on an incorrect flow rule.

15. A non-transitory computer-readable medium storing a set of instructions, the set of instructions comprising:
one or more instructions that, when executed by one or more processors of a device, cause the device to:
receive training data simulating different types of software-defined networking (SDN) attacks or anomalies;
remove a portion of data from the training data;
train a machine learning model with the training data to generate a trained machine learning model;
test the trained machine learning model with the portion of data removed from the training data to generate test results;

update the trained machine learning model based on the test results;

receive SDN data from multiple SDN controllers and multiple SDN devices of an SDN network;

perform natural language processing on the SDN data to clean the SDN data and generate clean SDN data;

process the clean SDN data, with the trained machine learning model, to identify an attack on the SDN network or one or more anomalies in the SDN data, wherein the attack includes one or more of a link discovery attack, a flow rule attack, or a host location attack; and perform one or more actions based on the attack on the SDN network or the one or more anomalies in the SDN data.

16. The non-transitory computer-readable medium of claim 15, wherein the one or more instructions, that cause the device to perform natural language processing on the SDN data to clean the SDN data and generate the clean SDN data, cause the device to:

clean the SDN data, based on domain knowledge, to generate pre-cleaned SDN data; and perform natural language processing on the pre-cleaned SDN data to format the pre-cleaned SDN data and generate the clean SDN data.

17. The non-transitory computer-readable medium of claim 15, wherein the one or more instructions, that cause the device to perform the one or more actions, cause the device to one or more of:

generate an alarm based on the attack on the SDN network or the one or more anomalies in the SDN data;

provide information about the attack or the one or more anomalies for display;

retrain the machine learning model based on the attack on the SDN network or the one or more anomalies in the SDN data;

cause one of the multiple SDN controllers to reroute traffic to avoid a fake link associated with a link discovery attack;

remove a flow rule of the SDN network that has been manipulated via a flow rule attack;

correct topology information, of the SDN network, that is associated with a host location attack;

remove a software instance of one of the multiple SDN controllers or a software instance of one of the multiple SDN devices; or replace the software instance with a new software instance of an SDN controller or a new software instance of an SDN device.

18. The non-transitory computer-readable medium of claim 15, wherein the training data includes one or more of:

data indicating a link layer discovery protocol packet transmitted via a false link;

data that causes an SDN controller to modify location information for a host device to indicate incorrect location information;

data indicating a pattern associated with an SDN device providing information indicating that the SDN device received a data packet from a non-existent SDN device; or data indicating a quantity of packets being processed based on an incorrect flow rule.

19. The non-transitory computer-readable medium of claim 15, wherein the one or more instructions, that cause the device to perform the one or more actions, cause the device to:

determine a correction to a software instance of one of the multiple SDN controllers or a software instance of one of the multiple SDN devices; and implement the correction to the software instance of the one of the multiple SDN controllers or the software instance of the one of the multiple SDN devices.

20. The non-transitory computer-readable medium of claim 15, wherein the training data includes one or more of:

data that simulates a link discovery attack, data that simulates a flow rule attack, or data that simulates a host location attack.

* * * * *